United States Patent [19]

Snyder

[11] Patent Number: 4,619,580
[45] Date of Patent: Oct. 28, 1986

[54] VARIABLE CAMBER VANE AND METHOD THEREFOR

[75] Inventor: Howard E. Snyder, Seattle, Wash.
[73] Assignee: The Boeing Company, Seattle, Wash.
[21] Appl. No.: 530,985
[22] Filed: Sep. 8, 1983
[51] Int. Cl.[4] .................. F01D 17/08; F01D 17/16
[52] U.S. Cl. .................................... 415/12; 416/39
[58] Field of Search .................. 415/12, 48; 416/39, 416/229 R, 229 A, 38

[56] References Cited

U.S. PATENT DOCUMENTS

| | | | |
|---|---|---|---|
| 1,347,003 | 7/1920 | Baumann et al. | 416/229 A |
| 3,038,698 | 6/1962 | Troyer | 415/12 |
| 3,042,371 | 7/1962 | Fanti | 415/12 X |
| 3,656,222 | 4/1972 | Jones | 29/156.8 H |
| 4,492,522 | 1/1985 | Rossmann et al. | 416/229 A |

FOREIGN PATENT DOCUMENTS

| | | | |
|---|---|---|---|
| 1001866 | 1/1957 | Fed. Rep. of Germany | 415/12 |
| 1055882 | 4/1959 | Fed. Rep. of Germany | 415/12 |
| 28378 | 2/1980 | Japan | 416/229 A |
| 78104 | 6/1980 | Japan | 415/48 |
| 125379 | 9/1980 | Japan | 416/39 |
| 833537 | 4/1960 | United Kingdom | 415/12 |
| 939505 | 10/1963 | United Kingdom | 416/229 A |
| 2046369 | 11/1980 | United Kingdom | 416/229 A |

*Primary Examiner*—Everette A. Powell, Jr.
*Attorney, Agent, or Firm*—Hughes & Cassidy

[57] ABSTRACT

A variable camber vane particularly suitable for use as a variable stator vane (20) has a secured root (22), a free tip (24) and a working face (26) disposed within and diverting flow of a working fluid, exhibiting temperature-responsive deflection of the tip as respects the root correlative to the temperature of the working fluid, is comprised of a sintered, generally laminar composite of a first amorphous metallic composition as a first vane element (32) and a second amorphous metallic composition as a second vane element (34), wherein the coefficients of thermal expansion for each of the compositions differ; whereby the camber of the vane varies in response to thermal variations of the working fluid.

4 Claims, 5 Drawing Figures

VARIABLE CAMBER VANE AND METHOD THEREFOR

DESCRIPTION

TECHNICAL FIELD

The present invention relates, generally, to a variable camber vane which exhibits temperature-responsive deflection of the tip as respects the root, correlative to the temperature of the working fluid within which the vane is disposed; and, more especially, to a variable camber stator vane which, when comprising an array defining a stator assembly in an air-breathing turbine engine, will automatically regulate gas flow to the turbine rotors as may be required in direct response to variations in temperature. The variable camber vanes of the present invention, when utilized as stator vanes in a gas turbine, may be associated with a generally conventional vane actuation system as typically employed in these types of devices; or, in certain situations, may be utilized to the exclusion of ancillary actuation mechanisms.

DESCRIPTION OF THE BACKGROUND ART

Operating efficiencies of air-breathing turbine engines have historically been altered by variations in the position of the exit edges of stator vanes, thereby controlling and adjusting the flow of exit gases impinging upon rotor vanes (customarily referred to as "buckets"). Most modern airplane turbine engines typically incorporate from one to six rings or stages of variable stator vanes in the compression stage, each of which may be comprised of approximately sixty to seventy variable vanes per ring. It has been known for decades that controlling the deflection of the individual stator vanes comprising each ring to correlate gas flow through the engine to the flight regime of the aircraft is beneficial, particularly in respect of fuel efficiency. More specifically, varying the space or equivalent aperture dimension between adjacent stators with variations in the fuel demanded for work performance requirements during or preparatory to flight is highly advantageous. Among those patent references which may be conferred with these thoughts in mind may be mentioned U.S. Pat. Nos. 2,065,974, 2,219,994 and 2,676,458.

With nearly fifty years' recognition of the advantages to be obtained by controlled manipulation or orientation of stator vanes, state of the art turbine engine are a vastly complicated affair of hardware as respects vane actuation systems. Looking to aircraft engines of the most recent technical evolution, variable stator vane actuation systems commonly include a plurality of hydraulic actuators, actuation mechanisms and linkages, and flexible feedback cables to achieve these results. Each variable stator vane actuator is usually connected through a clevis link and a multiple stage bellcrank to a master rod. Adjustable linkages interconnect variable vane actuation rings to those bell cranks which are, in turn, associated with the master rod. Connections between the actuator, clevis links, and master rod are made with bolts and bushings for stability; while other linkages are made through bolts and uniballs to eliminate misalignment or binding. The actuation rings, which are conventionally connected at a horizontal split-line of the compressor casing, rotate circumferentially about a horizontal axis of the compressor; whereby movement of the rings is transmitted to the individual vanes through vane actuating levers. A flexible cable attached to the linkage transmits a feedback signal to the main engine control. The feedback mechanism in the control repositions a pilot valve to stabilize the actuator signal when the vanes achieve the scheduled position. The variable stator vanes are positioned by variable stator vane actuators which are operated by fuel pressure from the main engine control. Within the main engine control is a variable stator vane scheduling cam having a three dimensional profile, which is positioned by engine speed and compressor inlet temperature signals. A variable stator vane feedback mechanism transmits actual vane position to the control while a variable stator vane pilot valve is positioned as a result of the comparison of the scheduling cam position and the feedback signal. Changes in engine speed rotate the scheduling cam while changes in compressor inlet temperature translate the cam axially. In turn, movement of the cam reposition the pilot valve which ports high pressure to either the head-end (closing) or rod-end (opening) of the variable stator vane actuators while venting the other end to bypass pressure.

As can be appreciated from the very terse description aforesaid, modern aircraft turbine engines incorporate very complicated mechanical mechanisms to achieve this required end of variation in stator positioning. There are substantial tradeoffs against the advantage of improved fuel efficiency when employing these types of assemblies. For example, initial adjustment, which must be made within carefully controlled limits, is a tedious and highly labor-itensive task. There is also a fair weight penalty associated with these elaborate mechanisms.

Within the context of the present invention, there have been various prior proposals with an eye toward the development of a so-called "smart" variable stator vane. These approaches have sought to take advantage of bimetallic construction and analogous geometric profiles so that the variations in inlet temperature of the working fluid may be used beneficially to alter the profile or camber of the stator. Exemplary of patented approaches for the automatic control over variations in the shape of stator vane in a gas turbine engine responsive to temperature changes in the environment surrounding those vanes are U.S. Pat. Nos. 3,038,698 and 3,042,371. Each of the proposals disclosed in those patents relies upon a conventional bimetallic couple. As the inlet temperature changes, so too does the chamber of the vanes. However, these approachs suffer inherent and serious limiting disadvantages all but excluding the use of such constructions in modern aircraft turbine engines. For example, the vanes disclosed in those references show mechanically unsupported elements which are likely to experience early failure in the noisy vibrational environment of a turbine engine. Both also overlook the distinct susceptibility of bimetallic couples to fatigue failure because of the high stress riser at the junction of the strip elements—the face-to-face juncture being prone to separation. Yet a worse reliability problem faces these types of proposals due to joining along vane edges by welding. As a rule of thumb, welded structures are typically avoided in environments which are subject to vibration as the predicted mode of failure is via cracking.

There are, of course, other thermally-responsive metallic compositions known in the art. "Nitinol", remarkable alloys of titanium, nickel and as of recently such other alloying constituents as cobalt and iron, to name but a few, exhibit the curious metallurgical phenomenon of thermal memory. Nitinol which has been formed at relatively high temperature may subsequently be crumpled, bent, or otherwise deformed at room temperature; then, due to its memory for the preformed shape, return thereto upon the application of a small amount of heat. Somewhat representative of these types of compositions are U.S. Pat. Nos. 3,764,227, 3,403,238 and 3,558,369. Thermal memory to the contrary notwithstanding, these types of compositions remain laboratory curiosities more than engineering alloys. There is currently no practical means of adapting this variety of composition to a controllable, repetitive deflection as is demanded by variations in stator vane camber within an aircraft engine.

Other references of incidental interest include U.S. Pat. Nos. 2,114,567 and 3,930,626, British Pat. No. 947,118 and German Pat. No. 1528887. While generally pertinent to temperature-responsive machinery elements, none adds much to those discussed in greater detail above.

Given the current state of the art, the need exists to provide a vane assembly, and especially a stator vane assembly for an aircraft turbine engine, which overcomes the tremendous complexity of current design on the one hand and eliminates the lack of reliability of simpler approaches on the other hand. Replacing complicated, costly, heavy actuator mechanisms without sacrificing reliability or efficiency in use is a goal heretofore elusive following the direction of the prior art.

SUMMARY OF THE INVENTION

The present invention advantageously provides a variable camber vane exhibiting thermally-responsive geometric variation; a vane particularly adapted for use within an array of similar vanes to comprise a stator vane assembly for an air-breathing turbine engine. The variable stator vane of the present invention is remarkable for its improved physical and chemical properties rendering the same particularly fit for use in an aircraft turbine engine. The variable stator vane assemblies contemplated hereunder may be employed to the exclusion of ancillary actuating mechanisms, thereby eliminating costly and heavy control devices. On the other hand, the instant stator vanes may be employed in concert with conventional actuating mechanisms; in these cases, the individual vanes may tolerate greater deviations in the accuracy of initial setup and/or maintenance of same throughout dynamic operation of an engine. Thus, the stator vanes of the present invention desirably respond to the need for an interstitial approach within the conventional proposals of the prior art for the purpose of varying stator vane profile.

The stator vanes of the present invention are further noteworthy in respect of ease of manufacture thereof. One particular advantage along these lines is the ability to provide uniform parts in terms of both physical and chemical properties which may include fairly complex shapes, but without the need to resort to costly or elaborate production methodologies. The benefits of matched vanes for a series of stators to comprise a given ring is a benefit which should not be underestimated in terms of overall operational efficiencies to be achieved by the present invention.

The foregoing, and other advantages, of the present invention may be realized in one aspect thereof by a variable camber vane having a secured root, a free tip and a working face for disposition within and flow diversion of a working fluid and temperature-responsive deflection of the tip as respects the root correlative to the temperature of that working fluid; which vane is comprised of a sintered, generally laminar composite of amorphous metallic compositions. In one form of the instant invention, the variable camber vane is comprised of a first vane element of a first amorphous metallic composition and a second vane element of a second amorphous metallic compositions wherein the coefficients of thermal expansion for the two differ; whereby camber of the vane varies in response to thermal variation in the working fluid. Since the temperature of the gas turbine stator vanes increases in approximately direct proportion to operating speed, the variable stator vanes move automatically in response to operational vagaries within the engine environment relative to that temperature. In particular, these variable stator vanes, when arranged in annular rings and acting as nozzles in advance of the rotor blades, will flex with a drop in temperature in a manner which reduces the gas flow rate and will flex in the opposite direction with a rise in temperature thereby tending to increase the fas flow rate all with an eye toward dynamic control over the combustion characteristics of the engine.

The variable camber vane of the present invention are fabricated from precursor powders of rapid solidification rate ("RSR") amorphous metallic compositions. The RSR powers may be appropriately disposed within a mold in order to achieve the proper laminar geometry and then subjected to hot isostatic pressing for consolidation and sintering. More preferably, preforms of the separate vane elements are first prepared at least to the compaction of elements exhibiting green strength; whereupon these precursors are hot isostatically pressed into the desired final shape. Ribbons, wires, flakes or other precompacts may likewise be used to this same end.

In a highly preferred embodiment of the present invention, surface grooves are formed laterally across the working and obverse faces of the vane, extending generally along the flow path of the working fluid. This highly preferred design permits tip deflection in response to thermal variation while precluding transverse and/or longitudinal deformation which might otherwise contribute to an unwanted "curling" of the vane.

Other advantages of the present invention, and a fuller appreciation of its construction, mode of operation, and production methodology will be gained upon an examination of the detailed description of preferred embodiments, taken in conjunction with the figures of drawing.

DETAILED DESCRIPTION OF THE INVENTION

The present invention relates, generally, to a variable camber vane which exhibits temperature-responsive deflection of the tip as respects the root, correlative to the temperature of the working fluid within which the vane is disposed; and, more especially, to a variable camber stator vane which, when comprising an array defining a stator assembly in air-breathing turbine engine, will automatically regulate gas flow to the turbine rotors as may be required in direct response to variations in temperature. The variable camber vanes of the present invention, when utilized as stator vanes in a gas turbine, may be associated with a generally conventional vane actuation system as typically employed in these types of devices; or, in certain situations, may be utilized to the exclusion of ancillary actuation mechanisms. Accordingly, the present invention will now be described with reference to certain embodiments within the aforementioned contexts; albeit those skilled in the art will appeciate that such a description is meant to be exemplary only and should not be deemed limitative.

Limiting the present discussion to the most preferred environment for the present invention (stator vanes in an aircraft turbine engine), variation within inter-stator spacing in a given ring or stage is conventionally undertaken to match the exit gas flow into the rotor stage to the performance requirements of the engine for, inter alia, improved fuel efficiency. As noted hereinabove, that alteration in stator geometry is conventionally achieved, in practice, by fairly complicated mechanical actuators while others have proposed the use of thermally-responsive vanes fabricated as bimetallic couple elements. For purposes of understanding the specific construction of the instant vanes, a detailed recapitulation of the mechanical actuation approach adds little; attention is therefore focused more particularly upon the latter proposal, exemplified in FIG. 1.

Figure 1:
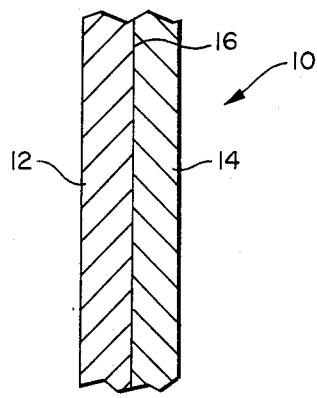
FIG. 1 is a transverse sectional view through a portion of a prior art variable camber vane employing a bimetallic couple construction.

FIG. 1 illustrates a vane, designated generally as 10, formed in accordance with certain prior art proposals. The vane 10 is comprised of a first vane element 12 and a second vane element 14 secured thereto in face-to-face relationship along a juncture 16. The proposed approach prescribes a bimetallic construction for the elements 12 and 14 comprised of metallic compositions having differing coefficients of thermal expansion. In accordance with well known physical laws governing the linear expansion of solids, the differential coefficients will result in an overall change in the curvature of the vane as the same is subjected to temperature variations.

The adaptability of bimetallic couples of this rather conventional sort appear workable on paper. However, integration of the structure of a vane such as vane 10 within a turbine engine, and especially an aircraft engine, is highly problematic. A principal limiting factor is the sharp junction or interface 16 existing between the adjacent elements, which arises as a consequence of this bimetallic configuration, exacerbated by the preferred joining technique of welding the vane elements 12 and 14 into the desired configuration. The environment obtaining within an aircraft turbine engine, or indeed any air-breathing turbine engine, tends to be hostile and in many cases corrosive to the constituents comprising the vane. Then too, proper operation of such a thermally-responsive stator vane demands repetitive flexure over normal operating conditions. Fatigue resistance is of paramount concern lest failure result in vane breakage. At the very least, the sharp juncture 16 contributes to a significant stress riser upon repetitive flexure. At worst, the suggested fabrication techniques statistically imply enhanced susceptibility to cracking including stress corrosion cracking depending upon the alloys employed. In capsule summary, therefore, proposals for the integration of thermally-responsive vanes based upon bimetallic constructions are unlikely to see the commercial light of day. Yet, the objective of providing thermally-responsive stator vanes remains a worthy pursuit.

Figure 2:
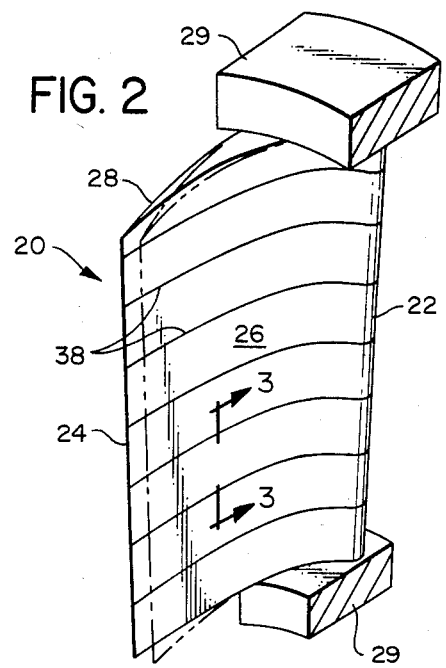
FIG. 2 is a generally schematic, isometric illustration of a variable camber vane in accordance with the present invention, showing the root secured and, in phantom lines, the manner of tip deflection in response to thermal variations within the environment of the vane.
Figure 3:
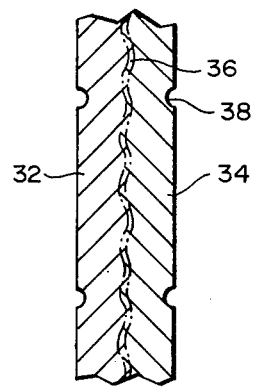
FIG. 3 is a sectional view taken substantially along the line 3—3 of FIG. 2.
Figure 4:
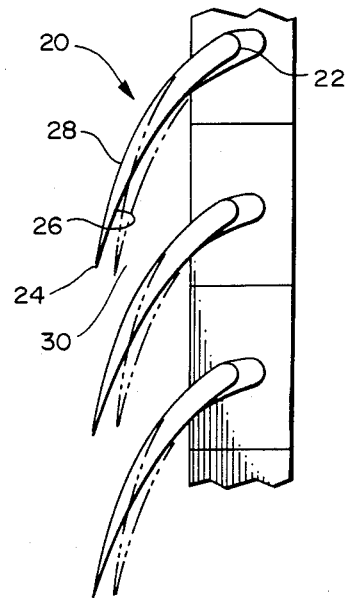
FIG. 4 is a generally schematic side elevation view, with parts broken away for clarity, of a plurality of stator vanes such as the one shown in FIG. 2, illustrating the manner in which the inter-vane spacing varies with variations in the temperature of the working fluid within a turbine engine; and, FIG. 5 is a sectional view, similar to FIG. 3, but showing a tertiary vane element within the stator provided for, inter alia, tailoring dynamic variations in the camber of the vane.

The instant invention responds to the call for a thermally-responsive stator vane and one which exhibits vastly improved properties vis-a-vis such prior art proposals as exemplified in FIG. 1. The vanes of the present invention are characterized as comprised of sintered, generally laminar composites of amorphous metallic compositions which, when fabricated as detailed below, exhibit improved strength, improved stiffness, and improved fatigue resistance while yet providing vane elements which will deflect in response to the thermal environment existing within the engine. The preferred metallic compositions are wide ranging in terms of chemical composition, but are characterized as rapid solidification rate ("RSR") amorphous compositions. FIGS. 2-4 illustrate generally one preferred form of stator vane in accordance with the present invention, designated generally as 20.

The overall shape of the vane 20 is defined by a root region 22, a tip region 24, a working face 26 and an obverse face 28. The root 22 is shown secured in FIG. 2 between annular ring members 29 (only a portion of which is illustrated for the sake of clarity). As noted below, the securing ring elements 29 may or may not include mechanical actuator rings for ancillary manipulation of the vane 20 as may be desirable. Irrespective of that consideration, gas flow impinges upon the working face 26 of the vane, moving from right to left in the figures. The vane 20 responds to the thermal environment existing within the turbine engine. More particularly, the variable stator vanes 20, when arranged in annular rings and acting as nozzles in advance of the rotor blades of the engine, will flex with a drop in temperature in a manner to reduce the gas flow rate and, as a consequence, tend to maintain the gas at an elevated temperature; conversely, with a rise in temperature the vanes will flex in the opposite direction, tending to increase the flow rate and thus achieve the objective of lessening the temperature of the gas. This is shown somewhat diagrammatically in the figures of drawing, where the full line drawings indicate the position of the vane at a high temperature while the low temperature orientation is illustrated in phantom lines. Thus, as can be best envisioned with respect to the partial assembly view of FIG. 4, the inter-vane spacing 30 through which the working fluid must pass is more or less obstructed by virtue of the change in vane conformation as dictated precisely by the temperature of that working fluid. In turn, this matches more closely the engine efficiency (particularly as respects fuel efficiency) with the work performance requirements of the flight regime.

The temperature responsive flexural modification of the camber of vane 20 is provided in principal measure by the cross-sectional composition as best viewed with reference to FIG. 3. These vanes are comprised of first vane element 32 and a second vane element 34 each of which is fabricated from a distinct amorphous metallic composition. The amorphous metals of interest are those made in accordance with RSR technology wherein the rapid solidification rate from the liquid phase yields not only a very fine grain size but extremely uniform metallurgical properties. As opposed to conventional cooling rates which may be as low as about 100° C. per second, resulting in multiple grain dendritic structures, rapid solidification rate techniques achieve cooling rates on the order of (or indeed in excess of) $10^{6°}$ C. per second. Particle sizes in the submicron range through about 150 microns are achieved wherein each particle may be viewed at a single amorphous grain of homogeneous composition and thus without a definitive grain boundary. When consolidated and sintered, these attributes lead in turn to improved physical and chemical properties for the vane 20 including, for example, increased strength, increased stiffness, and improved fatigue resistance as compared with wrought compositions. Furthermore, the use of RSR particles leads to the further advantage in the ease of fabrication of the vanes 20, even into relatively complex shapes, by generally conventional powder metallurgy techniques.

The vanes 20 of the present invention are most preferably fabricated by hot isostatic pressing of precursor materials in an appropriately designed mold or die having the overall conformation of the desired finished part. Although it is envisioned that the part may be formed by first layering particulate composition for one vane element within the die and thence that for the second vane element thereupon, followed by hot pressing to achieve a compacted, sintered part, it is far preferred to use precompacts. Although flakes, wires or ribbons are not ruled out in accordance with this preferred production methodology, rather the overall shape for each of the vane elements 32 and 34 is first impressed by compacting the RSR particulate or flake material to give it sufficient green strength for handling. Those precompacts are thence disposed within the die and subjected to a conventional hot isostatic pressing procedure in the cavity to yield the finished part. In contradistinction to bimetallic laminates such as the one shown in FIG. 1, an intermediate fusion or bonding zone 36, best viewed in FIG. 3, is established. Depending upon the precise materials utilized in the fabrication of the vane 20, that zone 36 may be a diffusion zone, an alloy zone, a zone of intermetallic formation between the constituents for each vane, with or without additional mechanical bonding due to such considerations as particle size, shape, and relative ductilities. Further along these lines, the juncture is not a sharp one as a consequence of the use of these preferred RSR compositions, thereby overcoming the two principal drawbacks associated with conventional bimetallic constructions—a sharp line of demarcation and the need to resort to, e.g., some sort of fusion bonding which can contribute to cracking phenomenon in use.

It has further been determined that the overall operational efficiencies of the vanes 20 may be improved over known thermally-responsive vanes by the inclusion of a series of lateral grooves 38 or like discontinuities across the faces of the two vane elements 32 and 34. The grooves 38 are formed laterally across the vanes 20, lying generally along the line of gas flow. These grooves tend to minimize thermal expansion transversely or longitudinally as respects the faces of the vane while permitting the desired flexure shown in the figures of drawing. Thus, unwanted tip curling which could otherwise occur is retarded if not prevented altogether. The grooves or discontinuities 38 are easily impressed within the vane by virtue of the preferred fabrication technique. For example, wires may be disposed within the cavity during the precompacting step and later stripped to leave the groove. Friable and/or combustible material may be employed in the alternative to this same end. In any event, the grooves achieve the noted purpose of curl retardation upon temperature cycling within the turbine. The size and spacing of the grooves 38 can and will vary in accordance with such variables as overall size, intended environment, material composition, and the like; all of which, however, may reasonably be predicted from first principles during normal design.

In much the same way, the precise materials desired for use in the fabrication of the vane 20 may be selected with due consideration for the intended environment for the vane. Based upon published data respecting coefficients of thermal expansion, density, strength, elasticity, corrosion/erosion resistance, and the like, those skilled in the art will have little difficulty in tailoring desirable alloys and physical dimensions properly. More specifically, curvature of the vane 20 may be predicted on the basis of thermal strain and the related thermal moment developed within each of the vane elements. With thermal strain being a direct function of the coefficient of thermal expansion and anticipated temperature range over which the vane will operate, its value is easily calculated from handbook tabulations of the coefficients of thermal expansion and knowledge of the temperature range over which the vane must operate. Thermal moment may then be computed as the integral over thickness of the vane element of thermal strain and a constituative property related to the stiffness of the material and Poisson's ratio for the selected composition.

An extremely wide range of compositions may be utilized in the fabrication of vane 20. Titanium alloys, alluminum alloys, superalloys and steel compositions may all find good use in the fabrication of vane 20 depending upon the design objectives at hand. Among various alternatives may be mentioned Ti6-4/Ti6-2-4-2, Inco 706, Inco 718, Inco 903, A286, 17-4 PH, Al 2219, Ti 17, H.S. 718, molybdenum alloys including pure molybdenum itself, Invar, brass, and other engineering alloys which will occur to those skilled in the art. It will be recognized from the foregoing listing that certain of the usable compositions exhibit environmental susceptibilities; for example, the tendency for rapid oxidation of molybdenum as would be expected within this atmosphere of a gas turbine engine. In such cases, suitable protective coatings may be provided; in the case of molybdenum, molybdenum disilicide as is conventional for its protection in oxidizing atmospheres. The incorporation of an environmentally protective coating may be made either by simple admixture in powder form to particulates in advance of a precompact stage, or an integral coating bonded to the vane during later stages of manufacture.

Figure 5:
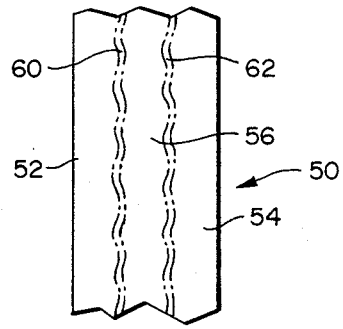

FIG. 5 shows an alternate embodiment of a vane 50 in accordance with the present invention. In this instance, the vane is comprised of first and second outer vane elements 52 and 54, respectively, separated by an intermediate or tertiary vane element 56. Consequently, pairs of bonding zones 60 and 62 are formed separating the respective elements. The tertiary zone 56 may be desirable in many circumstances. For example, should there be metallurgical incompatibility between the compositions comprising the outer elements 52 and 54, the tertiary zone may be included for bonding compatibility. Stiffness characteristics of the overall vane may be improved by judicious selection of a composition for the tertiary zone and its relative thickness vis-a-vis either or both of the elements 52 and 54. Some designs may require a relatively dense composition for one or another of the vane elements and, in order to offset the associated weight penalty (keeping in mind the vast numbers of vanes used in a modern aircraft engine), materials having a lower density may be included to counter the associated increase in weight.

The vanes of the present invention may be used in lieu of the complex mechanical actuation systems heretofore employed for variation in stator vane orientation. As recounted above, variations in the temperature of the working fluid will alter the inter-stator spacing as the vane responds to temperature variations by virtue of the differential in coefficients of thermal expansion between the elements thereof. The exact degree of change is one easily tailored through appropriate design; physical shape and alloy composition being the two principally contributing factors in that regard. It is equally envisioned that the stator vanes of the present invention may be utilized as replacements for vanes otherwise the subject of conventional mechanical control for variation in the orientation thereof. It is not at all uncommon to encounter an aircraft turbine engine of nine stages each having sixty or more stator vanes to be controlled during flight. Initial alignment to tolerances as close as perhaps 0.0005" on each vane can consume hundreds of hours of tedious work. And even with the most careful of alignment procedures, the noisy vibrational environment within a turbine makes periodic realignment necessary. Where vanes in accordance with the present invention are utilized there is somewhat greater latitude in both initial alignment and the need for subsequent realignment. Should a given vane be offset relative to an adjacent one the flow of gas past the misaligned vane will cause the same to be heated slightly greater than others due to the restrictive intervane spacing as a consequence of the misalignment. As that particular vane will tend to be at a slightly greater temperature than others which have proper spacing, the laminar composite of materials with a differential coefficient of thermal expansion will tend to create flexure of the vane returning it to the proper attitude automatically.

As is now evident from the foregoing description, the thermally-responsive stator vanes of the present invention offer vast improvements over vanes heretofore proposed. Fabrication is achieved with ease while efficiencies in operation are realized as well. Complicated mechanical actuators may either be eliminated altogether in certain instances or augmented to render the same more efficient in others.

While the invention has now been described with reference to certain preferred embodiments, those skilled in the art will appreciate that various substitutions, modifications, omissions and changes may be made without departing from the spirit thereof. Accordingly, the foregoing description is meant to be exemplary only and should not be deemed limitative of the scope of the claims granted herein.

I claim:

1. A variable camber vane having a first portion adapted to be secured to a mounting means, a second free tip portion spaced from said first secured portion, and a working face disposed within and diverting flow of a working fluid, for temperature-responsive deflection of said tip portion as respects said root coorelative to the temperature of said working fluid, said vane comprising:
    a. a sintered, generally laminar composite of a first amorphous metallic composition as a first vane element;
    b. a second amorphous metallic composition as a second vane element;
    c. said vane elements being characterized in that the coefficients of thermal expansion for each of said first and second compositions differ in a manner that the camber of said vane varies in response to thermal variations of said working fluid;
    d. each of said amorphous metallic compositions being an RSR amorphous metallic composition;
    e. each of said first and second vane elements being formed with an array of lateral surface grooves disposed generally along a flow path of said working fluid.

2. The variable camber vane of claim 1, wherein at least one of said amorphous metallic compositions further includes a coating of an environmentally-protective composition.

3. A vane assembly particularly adapted for use in an air breathing turbine engine, said vane assembly comprising:
    a. a first outer ring mounting member;
    b. a second inner ring mounting member disposed within said first member;
    c. a plurality of vane members mounted in an area between said first and second ring mounting members, each vane member being a variable camber vane, having a first secured portion by which it is mounted to said first and second ring mounting members, a second freetip portion spaced from said first secured portion, and a working face disposed within and diverting flow of a working fluid, for temperature responsive deflection of said tip portion as respects said root correlative to the temperature of said working fluid, each of said vane members comprising:
        i. a sintered, generally laminar composite of a first amorphous metallic composition as a first vane element;
        ii. a second amorphous metallic composition as a second vane element;
        iii. said vane elements being characterized in that the coefficients of thermal expansion for each of said first and second compositions differ in a manner that the camber of said vane varies in response to thermal variations of said working fluid;
        iv. each of said amorphous metallic compositions being an RSR amorphous metallic composition;
        v. each of said first and second vane elements being formed with an array of lateral surface grooves disposed generally along the flow path of said working fluid.

4. The vane assembly as recited in claim 3, wherein at least one of said amorphous metallic compositions further includes a coating of an environmentally-protective composition.

* * * * *